(12) United States Patent
Slater et al.

(10) Patent No.: US 7,252,072 B2
(45) Date of Patent: Aug. 7, 2007

(54) METHODS AND SYSTEMS OF DIAGNOSING FUEL INJECTION SYSTEM ERROR

(75) Inventors: Todd Slater, Columbus, IN (US); John E. Rogers, Columbus, IN (US); Michael D. Zieles, Columbus, IN (US)

(73) Assignee: Cummins Inc., Columbus, IN (US)

( * ) Notice: Subject to any disclaimer, the term of this patent is extended or adjusted under 35 U.S.C. 154(b) by 437 days.

(21) Appl. No.: 10/797,522

(22) Filed: Mar. 10, 2004
(Under 37 CFR 1.47)

(65) Prior Publication Data
US 2005/0051139 A1    Mar. 10, 2005

Related U.S. Application Data

(60) Provisional application No. 60/453,992, filed on Mar. 12, 2003.

(51) Int. Cl.
F02D 41/22 (2006.01)
(52) U.S. Cl. ............ 123/479; 123/496; 73/119 A
(58) Field of Classification Search ........ 123/479, 123/446, 447, 467, 496, 450, 451, 452; 73/119 A; 701/107
See application file for complete search history.

(56) References Cited

U.S. PATENT DOCUMENTS

| | | | |
|---|---|---|---|
| 3,727,081 A | 4/1973 | Davis et al. | |
| 4,096,830 A | 6/1978 | Long | |
| RE31,051 E | 10/1982 | Davis et al. | |
| 4,404,847 A * | 9/1983 | Larson | 73/119 A |
| 4,440,132 A | 4/1984 | Terada et al. | |
| 4,553,247 A * | 11/1985 | Harris | 375/214 |
| 4,589,401 A | 5/1986 | Karim et al. | |
| 5,203,868 A | 4/1993 | Ono | |
| 5,355,856 A | 10/1994 | Paul et al. | |
| 5,469,825 A | 11/1995 | Golab et al. | |
| 5,687,694 A | 11/1997 | Kanno | |
| 5,717,562 A | 2/1998 | Antone et al. | |
| 6,031,707 A | 2/2000 | Meyer | |
| 6,120,005 A | 9/2000 | Wright | |
| 6,123,092 A | 9/2000 | Torii | |
| 6,175,484 B1 | 1/2001 | Caruthers et al. | |
| 6,308,688 B1 | 10/2001 | French et al. | |
| 6,360,725 B1 | 3/2002 | Scherrbacher | |
| 6,505,609 B1 * | 1/2003 | Biester et al. | 123/479 |
| 6,508,232 B2 | 1/2003 | Sogawa | |
| 6,557,532 B1 * | 5/2003 | Nakayama et al. | 123/490 |
| 6,626,369 B1 | 9/2003 | Magel | |
| 2002/0000218 A1 | 1/2002 | Rueger et al. | |

(Continued)

FOREIGN PATENT DOCUMENTS

EP    1408221 A2    4/2004

(Continued)

Primary Examiner—Willis R. Wolfe
Assistant Examiner—Johnny H. Hoang
(74) Attorney, Agent, or Firm—Krieg DeVault LLP; J. Bruce Schelkopf, Esq.

(57) ABSTRACT

A fueling system for an internal combustion engine. The system has a voltage booster and a fuel injector. The voltage booster is operatively coupled to the injector to selectively drive the injector. A method includes determining compliance of a booster voltage with a threshold. The method further includes diagnosing fuel system error based upon the determining compliance.

5 Claims, 7 Drawing Sheets

U.S. PATENT DOCUMENTS

2002/0141876 A1    10/2002    French et al.

FOREIGN PATENT DOCUMENTS

| JP | 3009134 A | 1/1991 |
| JP | 3009135 A | 1/1991 |
| JP | 7269404 A | 10/1995 |
| JP | 9112735 A | 10/1995 |
| JP | 9151767 A | 11/1995 |

* cited by examiner

METHODS AND SYSTEMS OF DIAGNOSING FUEL INJECTION SYSTEM ERROR

REFERENCE TO RELATED APPLICATION

This application claims the benefit of U.S. Provisional Patent Application No. 60/453,992 filed on Mar. 12, 2003 and the same is incorporated by reference as if set forth herein in its entirety.

BACKGROUND

The present invention relates generally to methods, processes, systems, hardware, software, and/or combinations relating to fueling systems for internal combustion engines. More particularly, one form of the present invention relates to determining and/or diagnosing problems, difficulties or undesirable events or consequences related to a fuel injection system.

Modern internal combustion engines generally include a fuel delivery system, including one or more fuel injectors supplying fuel during engine operation. Further, the injectors and system associated with fuel injection have application in vaporizing, atomizing, and spraying gasoline, diesel, alcohol, hydrocarbon fuels, non-hydrocarbon fuels, and/or other combustible or non-combustible materials.

Internal combustion engine fuel systems, for example, high pressure common rail fuel systems, may use a booster to boost one or more fuel injector at desired times. Such fuel systems may experience errors and/or failures including, but not limited to, those relating to or involving electrical, mechanical, electromechanical, software, hardware, logic errors and/or failures as well as errors and/or failures of or relating to the injector(s), injector wiring harness, injector contacts, injector driver circuitry, and/or engine control module or other circuitry. These and other situations can result in engine damage, inefficiency, wear, increased emissions, and/or non compliance with governmental regulations. The present invention contemplates unique solutions to these and other problems.

SUMMARY

One embodiment of the present invention contemplates diagnosing and/or determining fueling system error and/or failure based at least in part upon a characteristic of an injector booster. Another embodiment of the present invention contemplates storing or providing notification of an error and/or failure of an injection system and/or disabling one or more portions of the system.

A further embodiment of the present invention contemplates a process including determining, in an internal combustion engine fuel system including a fuel injector and an injector booster operatively coupled to the injector to selectably drive at least in part the injector, an electrical characteristic of the booster, and diagnosing an error or failure of the system based at least in part upon said determining.

Another embodiment of the present invention contemplates a method for use with an injection system having a fuel injector and a booster capacitor, including discharging the booster capacitor, sensing a characteristic of the booster capacitor, and determining a system error or failure based at least in part upon said sensing.

Still another embodiment of the present invention contemplates a method including providing an internal combustion engine having a fuel injector and a booster, the booster operable to discharge to the injector and recharge after discharging, the booster having a voltage varying with the discharging and recharging, first determining whether the voltage has met or exceeded a first value, storing or indicating an error or failure of the system based upon the first determining, second determining whether the voltage has met or exceeded a second value, and disabling the fuel injector based upon said second determining.

Yet a further embodiment of the present invention contemplates a system including an injector including a fluid pathway, a control selectably regulating or controlling flow in or through the pathway, a booster in operative communication with the control, the booster selectably amplifying the operation of the injector, and means for determining or diagnosing one of system error and failure based at least in part on at least one booster characteristic.

An additional embodiment of the present invention contemplates a combination including an injector, a booster operatively coupled to the injector, the booster selectably altering operation of the injector, a detector in operative communication with the booster and adapted to receive or transmit information of the booster, and logic in operative communication with the detector, the logic adapted to process the information or act based on the information.

It is one object of the present invention to provide unique methods, systems, hardware, software, processes and/or combinations detecting and/or diagnosing error and/or failure of an injector system.

Related objects and embodiments of the present invention will be apparent from the following description.

DETAILED DESCRIPTION

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Various embodiments of the present invention relate to methods, processes, systems, hardware, software, and/or combinations relating to fuel injection systems including fueling systems for internal combustion engines. Various embodiments of the invention may relate to or involve diagnosing, determining, sensing, indicating, and/or warning of error(s) and or failure(s) which include without limitation malfunction, non-compliance, inefficiency, mis-operation and/or other similar problems, difficulties or undesirable events or consequences. It should be understood, however, that the invention does not necessarily require all or even any particular group or member of the exemplary embodiments. For further ease of reference and description the environment described herein is an internal combustion engine, although the invention is not necessarily so limited and engines are only exemplary systems.

Figure 1:
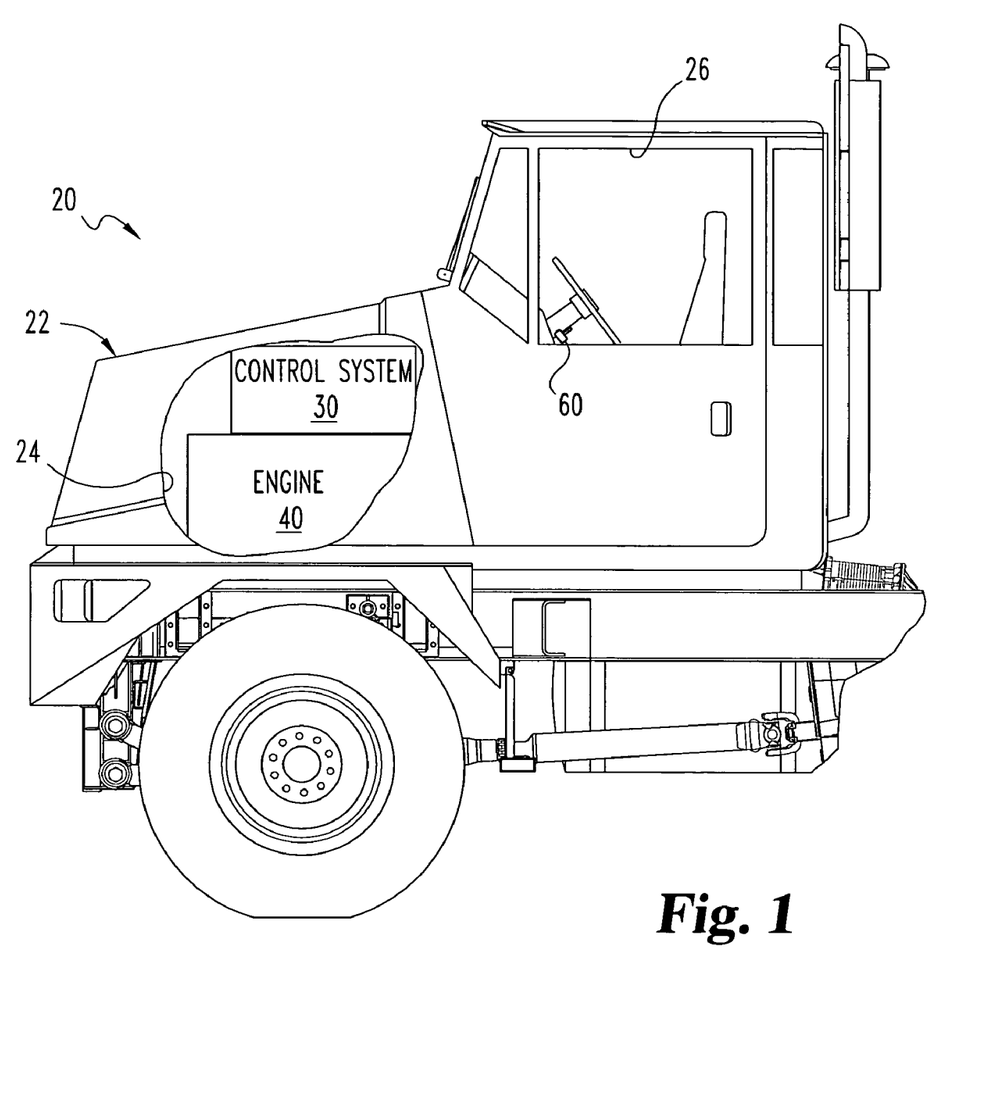
FIG. 1 is a partial cutaway view of selected physical components in one embodiment of the present invention.

The context of one embodiment of the present invention will now be discussed in relation to FIG. 1. System 20 includes a ground transport vehicle 22 with engine compartment 24 and vehicle operator compartment 26. A cutaway of engine compartment 24 reveals a schematically depicted control system 30 and internal combustion engine 40. Control system 30 monitors and regulates operation of engine 40, which is the primary source of motive power for vehicle 22. In vehicle operator compartment 26, a display 60 visible by an operator in operator compartment 26 may be integrated into the dash of the vehicle, affixed to the dash, projected onto a heads-up display (HUD), or presented in another form as would occur to one skilled in the art.

Figure 2:
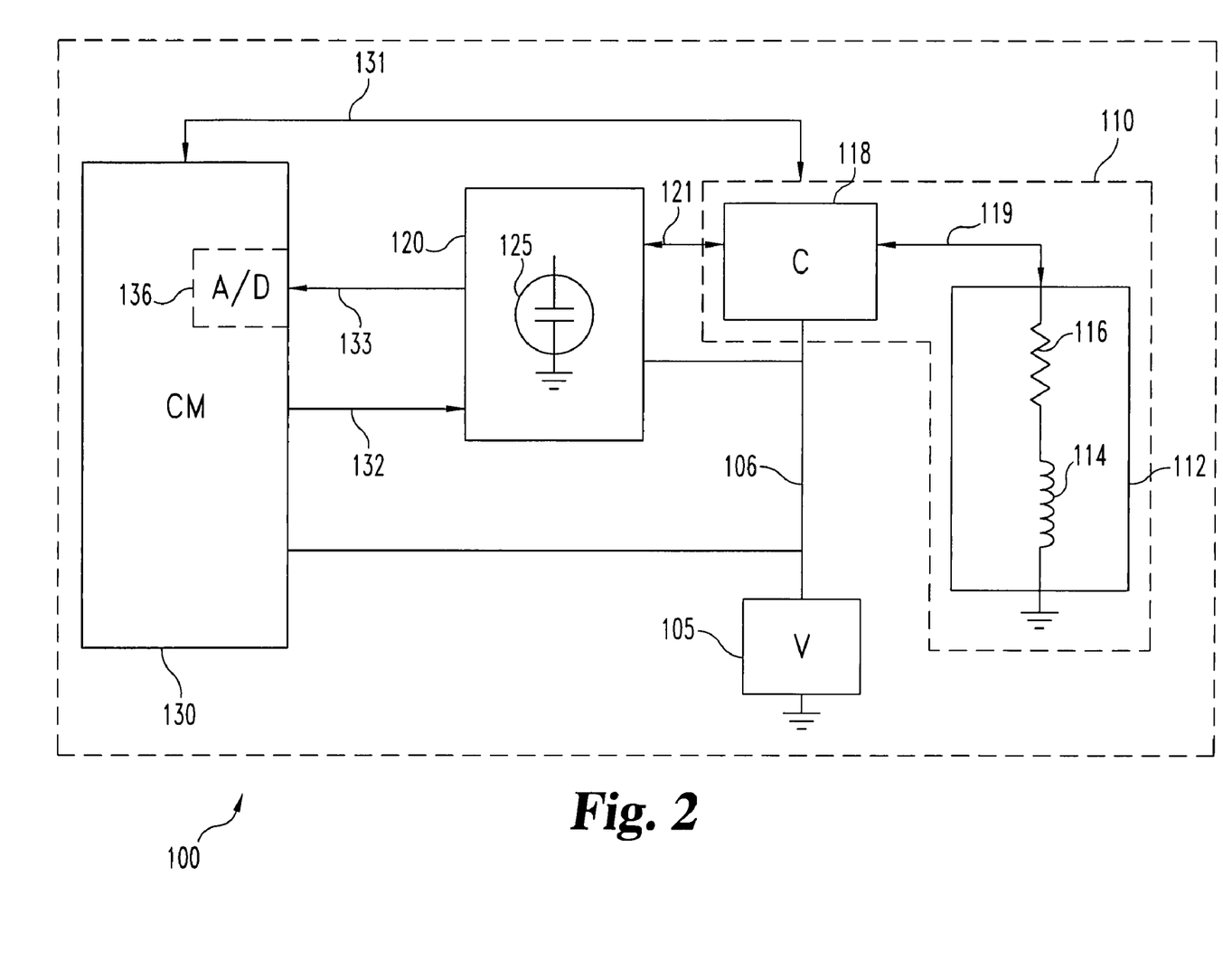
FIG. 2 is a schematic illustrating a portion of a fuel system for an internal combustion engine.

With reference to FIG. 2, there is shown a schematic illustration of a portion of an exemplary internal combustion engine fuel system 100. System 100 controls one or more injectors such as fuel injector 112. For clarity of illustration only one injector is illustrated; however, system 100 could include any number of injectors. Fuel injector 112 is electrically modeled with resistor 116 and inductor 114 which represent electrical resistance and inductance characteristics of fuel injector 112.

Fuel injector 112 is a part of output stage 110 which may also include any number of additional fuel injectors which may be the same or similar to fuel injector 112. In one form, output stage 110 includes connection 118 which is operatively coupled to fuel injector 112 by line 119. Connection 118 selectably connects line 119 and consequently injector 112 to lines 106 and/or 121 and could include, for example, hard, soft, mechanical, electrical, virtual, electro-mechanical, software-based, or other switch(es) or connection(s). Line 106 is connected to a voltage source 105 which may be, for example, a vehicle battery or any other power source. Line 106 also connects voltage source 105 to control module 130 and a booster which is shown as voltage booster 120.

Voltage booster 120 includes capacitor 125 which is grounded at one terminal and connected to another node or other circuitry or components of voltage booster 120 at the other terminal. The voltage booster 120 could also include any other charge storing element or device, battery, voltage source, current source or another device effective to boost operation of one or more fuel injectors or connections to the fuel injectors. Furthermore, capacitor 125 may be connected in a variety of other circuit combinations and these and other elements and devices may be present in addition to or instead of capacitor 125. Voltage booster 120 is charged by voltage source 105 at desired times. Charge from voltage source 105 is stored in capacitor 125 and can be discharged to fuel injector 112. Thus, when voltage booster 120 is connected to injector 112 via line 121 the voltage applied to fuel injector 112 can be boosted to a level greater than that provided by voltage source 105.

Voltage booster 120 is connected to control module 130 by lines 132 and 133. The control module 130 is also connected to output stage 110 by line 131. Control module 130 may be, for example, an engine control module or ECM with memory and microprocessor capabilities, a microcontroller, an ASIC or another type of microprocessor(s) or integrated circuit(s) or portions or combinations thereof. Control module 130 may output control signals via line 131 to output stage 110 to cause connection 118 to selectively connect fuel injector 112 to lines 106 and 121 as described above. Thus, fuel injector 112 can be activated by voltage supply 106 and voltage booster 120 at appropriate times. Similarly, control module 130 may output information via line 132 to control the operation of voltage booster 120, for example, to control charging, discharging, switching or connection of capacitor 125 or other elements, devices, or connections. Thus, timing and control programs and/or software can run on or be executed by control module 130 and can be used to generate the appropriate control signals to cause the desired operation of system 100 including the actuation of injector 112 and/or other injectors.

Information about the condition of booster 120, such as a voltage associated with booster 120, can be monitored, sampled, interrogated, and or stored directly or indirectly by or in connection with control module 130 and/or other memory or storage. For example, the voltage across capacitor 125, the voltage across capacitor 125 in combination with other circuitry or components of booster 120 or other physical or virtual node(s) or point(s) of or relating to booster 120 (including those described above and/or other circuit elements, devices, or components), current, heat, flux, time rate of change of such characteristics, or other electrical, electric or related characteristic(s) of capacitor 125 and/or other circuitry or components may be provided via line 133. As described above line 133 is connected to control module 130. Line 133 is also connected to analog to digital converter 136 of control module 130. Converter 136 operates to convert analog voltage or other information provided via line 133 to digital information for storage and/or processing by control module 130. While converter 136 is shown as an integral part of control module 130, it is also contemplated that converter 136 could be independent and connected between booster 120 and module 130. In other embodiments converter 136 may be omitted and digital information may be provided directly to module 130.

It should be understood that FIG. 2 and the related description are exemplary. Numerous modifications and other combinations are possible. For example, where lines 132 and 133 are shown separately as conveying information in their respectively indicated directions, one or more bi-directional connection(s), one or more uni-directional connection(s), one or more multi-path connection(s), or one or more of other type(s) or combinations of connection(s), such as electrical, optical, magnetic, radio, or RF could be used. Similarly, where lines 119, 121, and 131 show a single bi-directional connection any of the foregoing exemplary alternative(s) could be used.

It should be further understood that various components and elements illustrated in FIG. 2 could reside in hardware, software (which may include firmware), logic or combinations thereof. Furthermore, elements or components shown as distinct could be combined, layered, nested, or composed of one or more sub-pieces. For example, one or more of the illustrated or described elements or components could be combined with, found within, or could be a part of one or more other components or elements. Thus, a variety of configurations and connections are contemplated.

Figure 3:
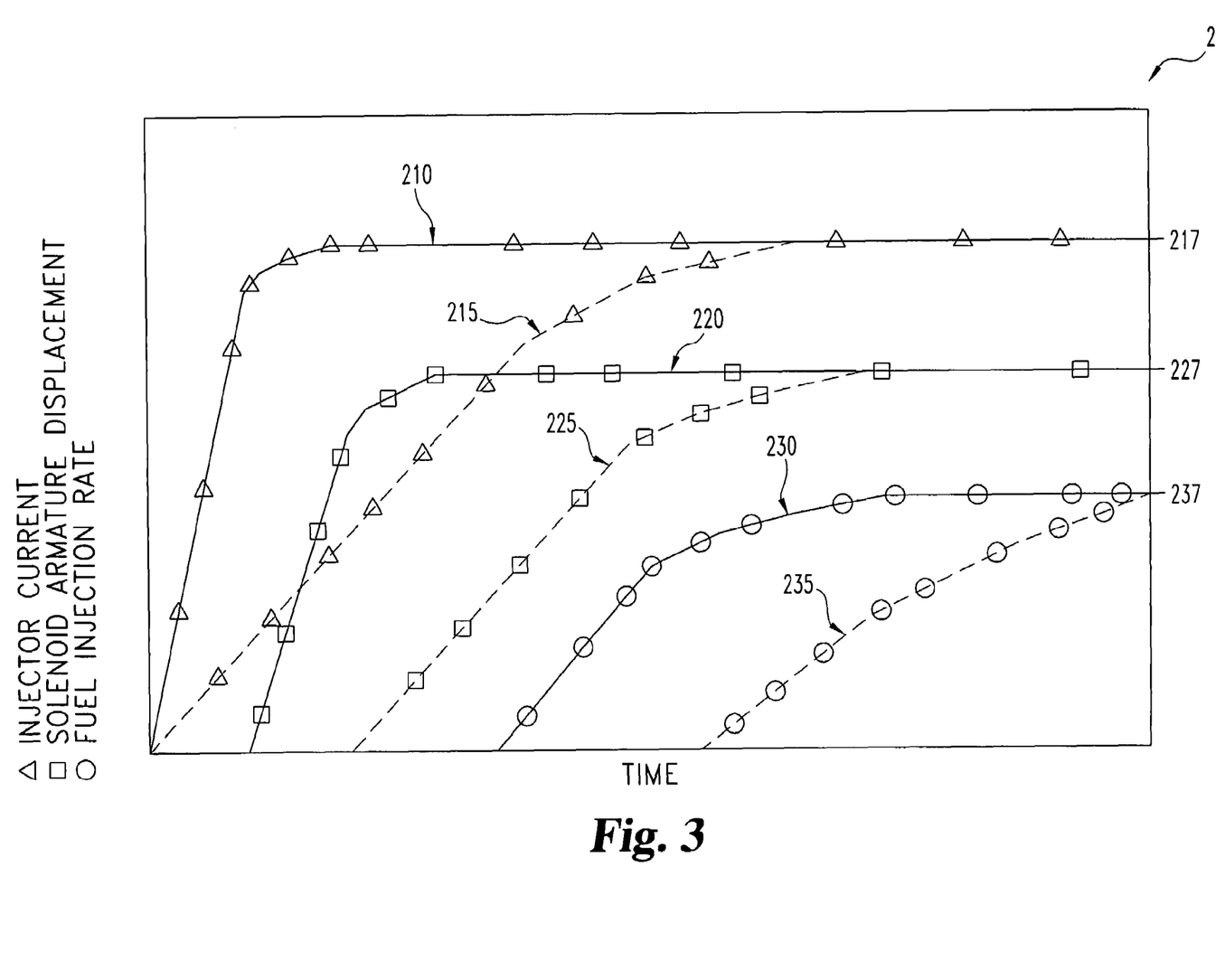
FIG. 3 is a graph illustrating the effects of an injector booster on several aspects of a fuel system for an internal combustion engine.

With reference to FIG. 3 there is illustrated graph 200 showing the effect of a voltage booster on several operational aspects of a fuel system. The independent variable on the x axis of graph 200 is time. Three dependent variables are shown on the y axis of graph 200: injector current, solenoid armature displacement, and fuel injection rate. The dependent variables are interrelated. Solenoid armature displacement is a function of injector current. Furthermore, fuel injection rate is a function of solenoid armature displacement.

Curve 210 shows variation of injector current over time for a fuel system that includes a voltage booster. Curve 215 shows variation of injector current over time for a fuel system that does not include a voltage booster or which the voltage booster is not functioning optimally or properly. Maximum injector current level 217 is indicated for one set of engine operation conditions. As graph 200 shows, curve 210 reaches maximum injector current level 217 at an earlier time than curve 215. Thus, an effect of a voltage booster on the fuel system is to more rapidly achieve a maximum injector current.

Curve 220 shows variation of solenoid armature displacement over time for a fuel system that includes a voltage booster. Curve 225 shows variation in solenoid armature displacement over time for a system that does not include a voltage booster or in which the voltage booster is not functioning optimally or properly. Maximum solenoid armature displacement level 227 indicates the maximum solenoid armature displacement for one set of engine operating conditions. As graph 200 shows, curve 220 reaches maximum solenoid armature displacement level 227 at an earlier time than curve 225. Thus, an effect of a voltage booster on the fuel system is to more rapidly achieve maximum solenoid armature displacement.

Curve 230 shows variation of fuel injection rate over time in a fuel system with a voltage booster. Curve 235 shows variation of fuel injection rate over time for a fuel system without a voltage booster. Maximum fuel injection rate level 237, indicates the maximum fuel injection rate for one set of engine operating conditions. Curve 230 reaches maximum fuel injection rate level 237 at a time earlier than curve 235. Thus, an effect of a voltage booster on the fuel system is to more rapidly achieve maximum fuel injection rate.

Figure 4:
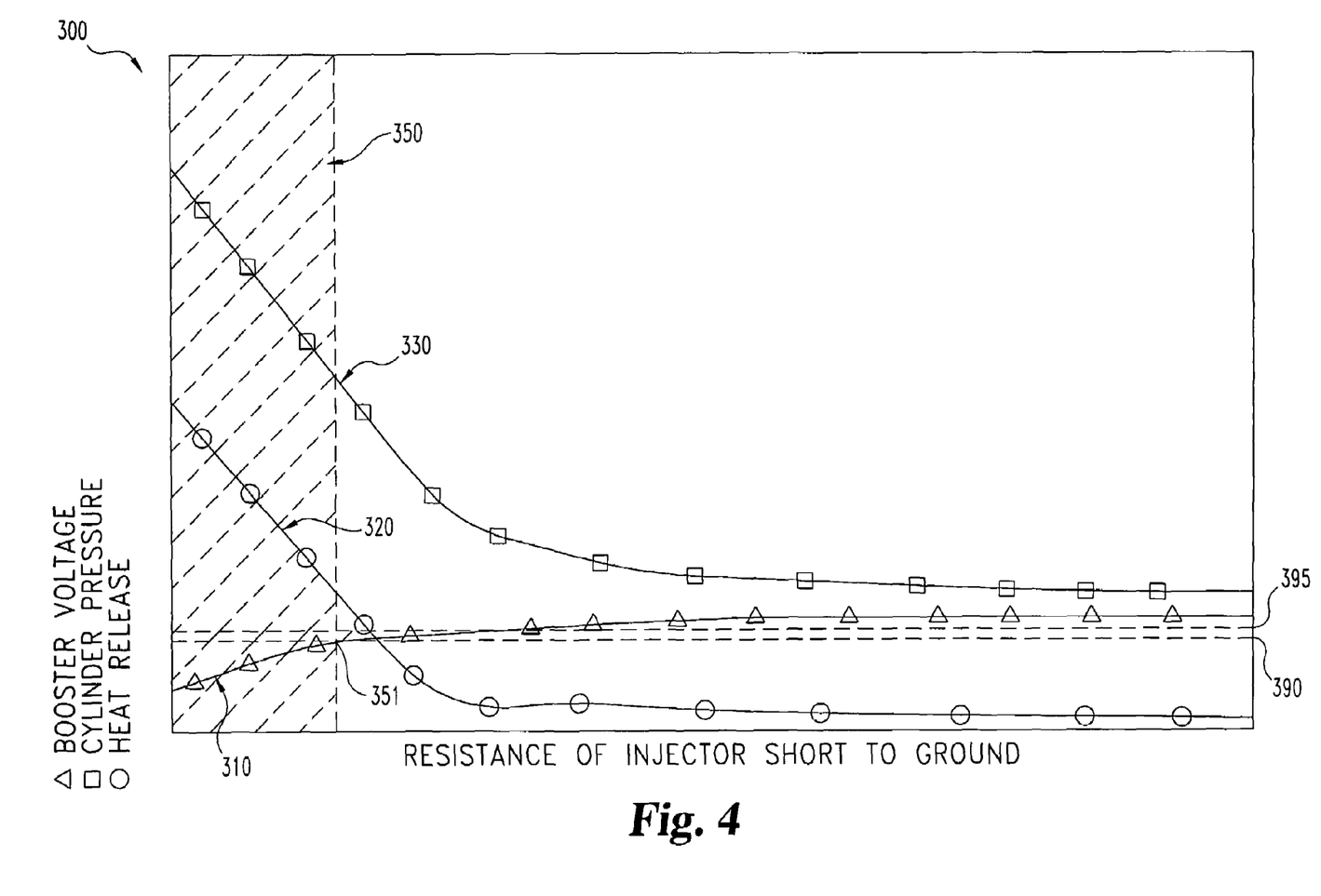
FIG. 4 is a graph illustrating the relationship of various aspects of internal combustion engine performance to the variation in resistance of a fuel injector short to ground.

With reference to FIG. 4, there is shown graph 300 which illustrates the relationship of various aspects of internal combustion engine performance to the variation in resistance of a fuel injector short to ground. The independent variable on the x axis is the resistance of a fuel injector short to ground which increases from left to right. The dependent variables on the y axis are booster voltage, cylinder pressure, and heat release.

Curve 310 shows an example of variation in booster voltage with change in resistance of injector short to ground. As resistance increases from left to right, booster voltage also increases. This may result from an injector short to ground which interferes with the desired charging of the voltage booster. Consequently, as the resistance of the short increases the booster is able to charge to a greater voltage. An insufficiently charged booster can affect cylinder pressure and heat release and/or other engine characteristics.

Curve 320 shows an example of variation of heat release versus the change in resistance of an injector short to ground. Curve 330 shows an example of variation in cylinder pressure with resistance short to ground. As graph 300 shows, cylinder pressure and heat release both decrease as the resistance of injector short to ground increases. This is a consequence of the dependence of cylinder pressure and heat release on proper injector operation.

Graph 300 also shows shaded region 350. Shaded region 350 is an exemplary cutoff beyond which cylinder pressure and heat release cause engine damage and/or an increase in emissions beyond an acceptable level. The intersection of region 350 and curve 310 at point 351 can be used to establish an exemplary booster shutdown voltage level 390 at which fuel injector(s) must be shut down in order to avoid engine damage and/or unacceptably increased emissions. It is desirable to provide an indication in advance of shutdown. To accomplish this, exemplary warning voltage level 395 can be selected at a level above that of shutdown level 390.

Figure 5:
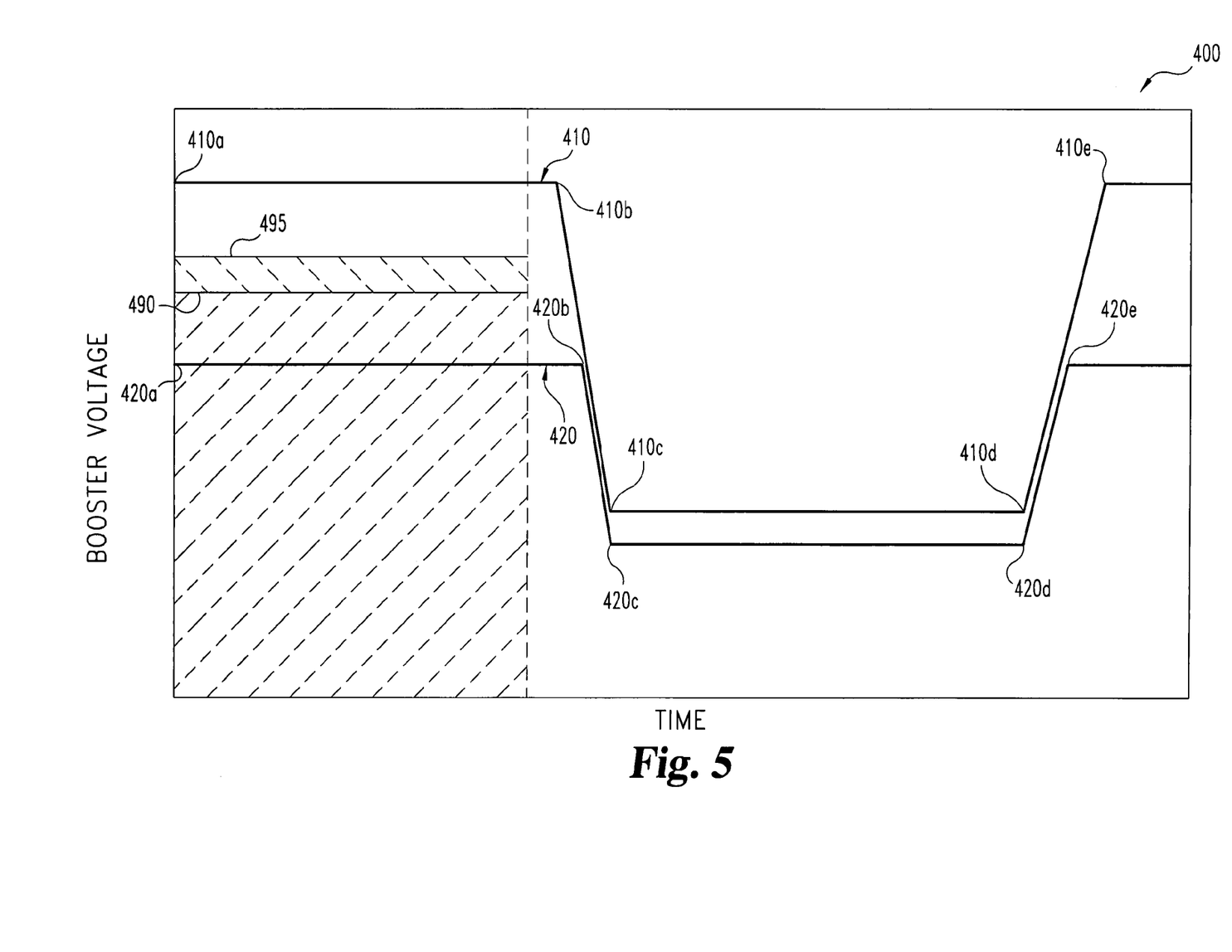
FIG. 5 is a graph illustrating the variation of a voltage booster voltage wave form over time.

With reference to FIG. 5, there is shown graph 400 depicting an example of the variation of a booster voltage waveform over time. The x axis shows independent variable time. The y axis shows dependent variable booster voltage. Curve 410 shows the booster voltage wave form for a properly functioning system. Beginning at point 410*a*, curve 410 is at a level indicating that the booster is fully charged and remains at that state until point 410*b*. At point 410*b*, curve 410 decreases over time to point 410*c*. Between points 410*b* and 410*c* the booster is discharging. At point 410*c* the booster is fully discharged. The booster remains fully discharged between points 410*c* and 410*d*. At point 410*d* the booster begins to recharge and continues to recharge until point 410*e*. At point 410*e* the booster is again fully charged. During engine operation this process may repeat with the same, similar or different timing(s) and/or level(s).

Curve 420 shows an exemplary booster voltage wave form for a fuel injection system experiencing error and/or failure. Beginning at point 420*a* curve 420 is at a voltage level indicating maximum charge for a system experiencing a particular exemplary error and/or failure. Curve 420*a* remains at this level until at 420*b* at which point the booster begins to discharge or in other embodiments otherwise amplify operation of injector(s). The booster discharges between points 420*b* and 420*c*. At point 420*c* the booster has completely discharged and remains completely discharged until point 420*d*. At point 420*d* the booster begins to recharge. The booster recharges until point 420*e*, at which point the booster has reached the state that is fully charged for such a failed system.

Graph 400 shows that an exemplary voltage level for a fully charged booster in a system experiencing exemplary error and/or failure, for example, between points 420*a* and 420*b* on curve 420, is at a lower voltage level than that of a fully charged booster in a properly functioning system, for example, between points 410*a* and 410*b* on curve 410. Thus, voltage thresholds can be defined to determine whether a system is property functioning. Threshold 495, for example, is defined as a voltage level which will trigger an indication that the system has failed. Further, threshold 490 is defined, for example, as a voltage level that will trigger shutdown of a fuel injector. Thus, if the voltage of a voltage booster is measured during the fully charged time periods, a comparison between the measured level and threshold levels 495 and/or 490 can be made to determine and/or diagnose operation of the system. Based on this and/or other information, a warning can be provided, data indicating a failure state can be stored, and/or fuel injectors can be shut down, for example, or other diagnosing and/or detecting of error and/or failure may occur. Thresholds 490 and 495 or other similar thresholds can be determined, for example, based upon levels 390 and 395 as described in connection with FIG. 4.

It should be understood that the illustrations of FIGS. 3, 4, and 5, and the related description are exemplary and that numerous other variations are contemplated. For example, different variables, curves, data points, performance zones, thresholds, characteristics, relationships, levels, timings, values and/or functional dependencies may be presented in various embodiments of the present invention, including those described above. Furthermore, it should be understood that the specific and/or general characteristics, qualities, or relationships illustrated and described need not necessarily be present in various embodiments of the present invention.

Figure 6:
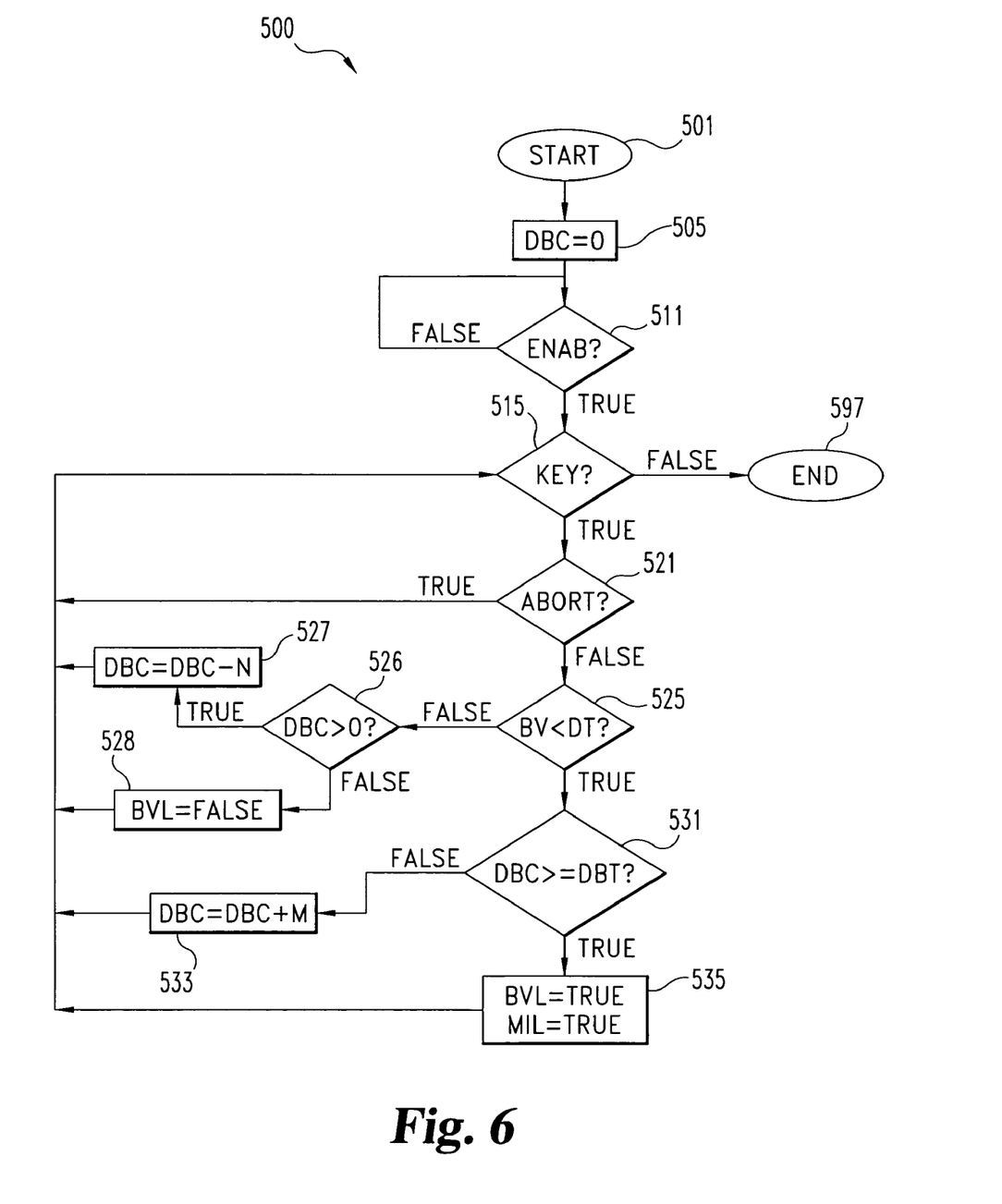
FIG. 6 is a flow chart illustrating an algorithm according to one embodiment of the present invention.

With reference to FIG. 6, there is illustrated flow chart 500 which shows one example of the operation of an exemplary voltage booster diagnostic algorithm. The algorithm can be embodied, for example, in software, logic, firmware, and/or hardware of control module 130 of FIG. 2 and/or in other components or circuitry which can execute, process or run the algorithm or portions or combinations thereof. Chart 500 begins in start state 501. From start state 501, the flow chart 500 progresses to operation 505, which sets variable DBC equal to zero. Variable DBC is used as a counter to track a debounce condition of an engine fueling control system. From operation 505, chart 500 proceeds to conditional 511 which tests variable ENAB. Variable ENAB is used to determine whether the algorithm has been enabled. If variable ENAB is false, chart 500 proceeds back to conditional 511. If variable ENAB is true, chart 500 proceeds to conditional 515.

Conditional 515 checks the condition of variable KEY. Variable KEY is used to determine whether the key switch which controls operation of the internal combustion engine is on. If variable KEY is false, chart 500 proceeds to end state 597. If variable KEY is true, chart 500 proceeds to conditional 521.

Conditional 521 tests variable ABORT. Variable ABORT is used to determine whether one or more abort condition for the fuel system exists. If variable ABORT is true, chart 500 returns to conditional 515. If variable ABORT is false, chart 500 proceeds to conditional 525.

Conditional 525 tests whether variable BV is less than variable DT or otherwise tests the two variables. Variable BV can be used to store the value of a voltage or other characteristic or property associated with a booster, for example, as were described above in connection with FIG. 2. Variable DT is used to store a diagnostic threshold. If variable BV is less than variable DT, conditional 525 is true and chart 500 proceeds to conditional 531. If variable BV is not less than variable DT, conditional 525 is false and chart 500 proceeds to conditional 526.

Conditional 531 tests whether variable DBC is greater than or equal to variable DBT or otherwise tests the two variables. Variable DBC was described above. Variable DBT is a debounce or other threshold established to test variable DBC. If conditional 531 is true, chart 500 proceeds to operation 535. If conditional 531 is false, chart 500 proceeds to operation 533.

Conditional 526 tests whether variable DBC is greater than zero or another value. If conditional 526 is true, chart 500 proceeds to operation 527. Operation 527 decrements variable DBC by setting variable DBC equal to the present value of variable DBC minus N where N is an amount by which variable DBC is decremented. From operation 527 chart 500 proceeds to conditional 515. If conditional 526 is false, chart 500 proceeds to operation 528. Operation 528 sets variable BVL equal to false or another value. Variable BVL is used as an indicator of whether a voltage booster voltage low error or other error exists. From operation 528 chart 500 returns to conditional 515.

Operation 533 sets variable DBC equal to value of DBC plus M. M is a constant that is used to increment the value of variable DBC whereby the diagnostic debounce counter is incremented. From operation 533 chart 500 returns to conditional 515.

Operation 535 sets variable BVL equal to true and sets variable MIL equal to true. As discussed above variable BVL indicates whether a voltage booster voltage low error exists. When variable BVL is true such an error does exist. Accordingly, variable MIL is also set equal to true. Variable MIL is used to control the display of a warning indication, for example, a malfunction indication lamp, other visual, auditory, or any other indicia or combinations thereof.

Figure 7:
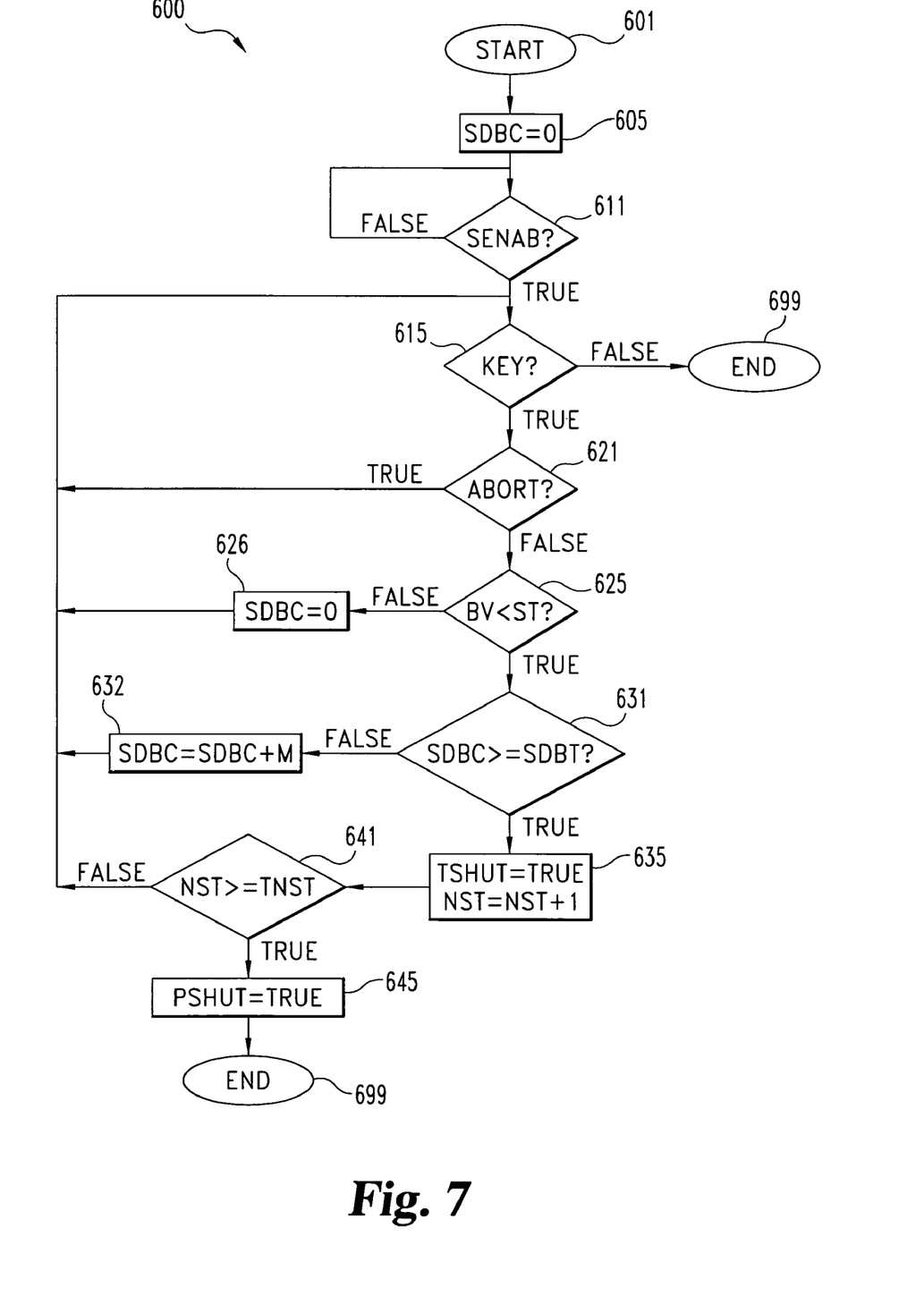
FIG. 7 is a flow chart illustrating an algorithm according to another embodiment of the present invention.

With reference to FIG. 7, there is shown flow chart 600 which describes an example of the operation of an algorithm useful for shutting down one or more fuel injectors affected by error and/or failure. The shutdown algorithm of flow chart 600 can be embodied, for example, in software, logic, firmware, and/or hardware of control module 130 of FIG. 2 and/or in other components or circuitry which can execute, process or run the algorithm or portions or combinations thereof. The shutdown algorithm begins at start state 601 and proceeds to operation 605. Operation 605 sets variable SDBC equal to zero or another value. Variable SDBC is used as a counter for a debounce condition of the algorithm of flow chart 600. From operation 605 chart 600 proceeds to conditional 611.

Conditional 611 tests variable SENAB. Variable SENAB may be used to determine whether the algorithm is enabled. If conditional 611 is false, chart 600 returns to conditional 611. If conditional 611 is true, chart 600 proceeds to conditional 615.

Conditional 615 tests variable KEY. Variable KEY may be used as an indication of whether the key switch or other control or interrupt which controls operation of the internal combustion engine is on. If variable KEY is false, chart 600 proceeds to end state 699. If variable KEY is true, chart 600 proceeds to conditional 621.

Conditional 621 tests variable ABORT. Variable ABORT may be used to determine whether an abort condition exists. If variable ABORT is true, chart 600 proceeds to conditional 615. If Variable ABORT is false, chart 600 proceeds to conditional 625.

Conditional 625 tests whether variable BV is less than or equal to variable ST or otherwise tests the variables. Variable BV is used to store the value of a voltage or other characteristic or property associated with a booster, for example, as described above in connection with FIG. 2. Variable ST is used to store a shutdown or other threshold against which variable BV can be compared. If conditional 625 is false, chart 600 proceeds to operation 626. Operation 626 sets variable SDBC equal to zero. If conditional 625 is true, chart 600 proceeds to conditional 631. This operation resets the shutdown debounce counter. From operation 626, chart 600 proceeds to conditional 615.

Conditional 631 tests whether variable SDBC is greater than or equal to variable SDBT or otherwise tests the variables. As discussed above, variable SDBC is a debounce counter. Variable SDBT is a debounce threshold against which variable SDBC can be checked. If conditional 631 is false, chart 600 proceeds to operation 632. Operation 632 sets variable SDBC equal to the value of variable SDBC plus M where M is an increment value. Thus, the debounce counter is incremented. From operation 632, chart 600 proceeds to conditional 615.

If conditional 631 is true, flow chart 600 proceeds to operation 635. Operation 635 sets variable TSHUT equal to true or another value. Variable TSHUT is used to determine whether one or more affected fuel injectors should be shut down for a specific number of cam revolutions or another predetermined time period or event period. Operation 635 also sets variable NST equal the value of variable NST plus 1. Variable NST may be used to track number of times that variable TSHUT has been set equal to true. From operation 635, flow chart 600 proceeds to conditional 641.

Conditional 641 tests whether variable NST is greater than or equal to variable TNST or otherwise tests the variables. Variable TNST is a threshold that may be used to test the variable NST. If conditional 641 is false, flow chart 600 proceeds to conditional 615. If conditional 641 is true, flow chart 600 proceeds to operation 645. Operation 645 sets variable PSHUT equal to true. Variable PSHUT is to determine whether to shut down certain fuel injectors until the next key on state is true. From operation 645, flow chart 600 proceeds to end condition 699.

It should be understood that the illustrations of FIGS. 6 and 7 and the related description are exemplary and that numerous other variations are contemplated. For example, modified, combined, or different variables, states, events, conditional, tests, operations, logics, systems, flow charts and/or algorithms are contemplated. Furthermore, portions and/or combinations of the illustrated and described charts and algorithms and/or variations thereof may be present in various embodiments of the present invention, although no portion, whole, or combination need necessarily be present. Also, it should be understood that the foregoing may reside in hardware, software, firmware, logic or combinations or portions thereof and may be run, processed, executed, loaded and/or stored in whole or in part, in or on different components devices or codes, separately, simultaneously, concurrently and/or in a time or resource sharing configuration or various combinations thereof.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention including, but not limited to those described above are desired to be protected. It should be understood that while the use of words such as exemplary, preferable, preferably or preferred in the description above indicates that the feature so described may be typical or more desirable, it nonetheless may not be necessary and embodiments lacking the same may be contemplated as within the scope of the invention, that scope being defined by the claims that follow. In reading the claims it is intended that when words such as a, an, at least one, at least a portion are used there is no intention to limit the claim to only one item unless specifically stated to the contrary in the claim. Further, when the language such as at least a portion and/or a portion is used the item may include a portion and/or the entire item unless specifically stated to the contrary.

What is claimed is:

1. A method comprising:
   providing an internal combustion engine having a fuel injector and a booster capacitor, the booster capacitor operable to discharge to the injector and recharge after discharging, the booster capacitor having a voltage varying with the discharging and recharging;
   first determining whether the voltage has met or exceeded a first value, the first determining includes measuring a voltage value across the booster capacitor and providing the voltage value to a controller;
   storing or indicating an error or failure of the system based upon the first determining;
   second determining whether the voltage has met or exceeded a second value, the second determining includes measuring a voltage value across the booster capacitor and providing the voltage value to a controller; and
   disabling the fuel injector based upon said second determining.

2. The method of claim 1 wherein said first determining occurs before said second determining.

3. The method of claim 1 wherein said first determining occurs after said second determining.

4. The method of claim 1 wherein said first determining and said second determining are at least partially contemporaneous.

5. The method of claim 1 wherein the voltage of said first determining and the voltage of said second determining are measured at different times.

* * * * *